(12) United States Patent
Arar

(10) Patent No.: US 8,483,324 B2
(45) Date of Patent: Jul. 9, 2013

(54) SIGNAL DETECTION IN MULTIPLE-INPUT-MULTIPLE-OUTPUT COMMUNICATION SYSTEM

(75) Inventor: Maher Arar, Kamloops (CA)

(73) Assignee: Wi-Lan, Inc., Ottawa (CA)

( * ) Notice: Subject to any disclaimer, the term of this patent is extended or adjusted under 35 U.S.C. 154(b) by 542 days.

(21) Appl. No.: 12/594,177

(22) PCT Filed: Apr. 5, 2007

(86) PCT No.: PCT/CA2007/000587
§ 371 (c)(1),
(2), (4) Date: Feb. 12, 2010

(87) PCT Pub. No.: WO2008/122103
PCT Pub. Date: Oct. 16, 2008

(65) Prior Publication Data
US 2010/0150279 A1    Jun. 17, 2010

(51) Int. Cl.
*H04L 27/06* (2006.01)
(52) U.S. Cl.
USPC .......................... 375/340; 375/260
(58) Field of Classification Search
USPC ............... 375/259–260, 295, 316, 340, 347, 375/267
See application file for complete search history.

(56) References Cited

U.S. PATENT DOCUMENTS

| 7,342,970 B2 * | 3/2008 | Liu | 375/259 |
| 7,489,746 B1 * | 2/2009 | Awater et al. | 375/341 |
| 7,668,268 B2 * | 2/2010 | Heiskala | 375/348 |
| 2003/0035490 A1 * | 2/2003 | Gollamudi | 375/267 |
| 2005/0249302 A1 | 11/2005 | Leshem et al. | |
| 2006/0165192 A1 | 7/2006 | Ito | |
| 2006/0251061 A1 * | 11/2006 | Kim et al. | 370/366 |
| 2006/0268963 A1 | 11/2006 | Yoshida | |

OTHER PUBLICATIONS

G.J. Foschini and M.J. Gans, *On limits of wireless communications in a fading environment when using multiple antennas*, Wireless Personal Comm. 6 (1998), No. 3, pp. 311-335.

I.E. Telatar, *Capacity of multi-antenna gaussian channels*, European Trans. Telecom. 10 (1999), No. 6, pp. 585-595.

(Continued)

*Primary Examiner* — Jean B Corrielus
(74) *Attorney, Agent, or Firm* — Procopio, Cory, Hargreaves & Savitch LLP

(57) ABSTRACT

Methods and apparatuses for detecting signals in a MIMO communication system include receiving symbols coded into pairs using a space-time code. Estimating a channel matrix that identifies the response between multiple transmit and receive antennas in the MIMO communication system. Performing a QR factorization on the channel matrix to obtain Q and R matrices. Determining a receive vector corresponding to a plurality of transmitted symbols received by the multiple receive antennas and transforming the receive vector based upon the Q matrix. Estimating a value of at least two received symbols to determine at least two estimated symbols. Then removing a contribution of the estimated symbols from the receive vector to determine a revised received vector. Estimating a value of at least two additional received symbols to determine at least two additional estimated symbols.

10 Claims, 10 Drawing Sheets

OTHER PUBLICATIONS

Diagonal Bell Labs Layered Space-Time G.J Foschini, *Layered space-time architecture for wireless communication in a fading environment when using multiple antennas*, Bell Lab. Tech. J. 1 (1996), No. 2, pp. 41-59, also known as D-BLAST.

Vertical Bell Labs Layered Space-Time g.D. Golden, G.J. Foschini, R.A. Valenzuela, and P.W. Wolniansky, *Detection algorithm and initial laboratory results using the V-BLAST spacetime communication architecture*, Electron. Lett., 35 (1999), No. 1, pp. 14-15, or V-BLAST.

Woo-Joon Choi, R. Negi, and J.M. Cioffi, *Combined ML and DFE decoding, for the V-BLAST system*, ICC 2000 3 (2000), pp. 1243-1248.

David Gesbert, Mansoor Shafi, and Da shan Shiu, *From theory to practice: An over of MIMO space-time coded sireless systems*, IEEE Journal 21 (2003), No. 3, pp. 281-302.

G.J. Foschini et al., *Analysis and performance of some basic space-time architectures*, IEEE Journal Selected Areas in Comm. 21 (2003), No. 3, pp. 281-320.

S.M. Alamouti, *A simple transmit diversity technique for wireless communications*, IEEE Journal on Selected Areas in Communications 16 (1998), No. 8, pp. 1451-1458.

Global Telecommunications Conference, 2003. GLOBECOM '03 (pp. 581-585), "*Channel estimation and data detection for MIMO-OFDM systems*", Dec. 2003, Jiang et al.

PCT/CA2007/000587 International Search Report and International Report on Patentability, 7 pages (2007).

Arar et al. "Efficient Detection Algorithm for 2N×2N MIMO Systems using Alamouti Code and QR Decomposition." IEEE Communications Letters. 10(12):819-821 (Dec. 2006).

\* cited by examiner

SIGNAL DETECTION IN MULTIPLE-INPUT-MULTIPLE-OUTPUT COMMUNICATION SYSTEM

BACKGROUND

1. Field of the Invention

This invention relates generally to a wireless communication system, and in particular to MIMO detection techniques.

2. Background

Multiple-Input-Multiple-Output, popularly known as MIMO, where multiple antennas are employed at both ends of the communication link, has recently emerged as a promising technology for providing spectral efficiencies far beyond those achieved by Single-Input-Single-Output (SISO) systems, where a single antenna is employed at both ends of the communication link.

Developing an algorithm they later named D-BLAST, researchers at Bell Labs demonstrated unprecedented spectral efficiencies on the order of 42 bits/s/Hz. A relatively less computationally intensive algorithm known as V-BLAST was proposed later. V-BLAST suffered in performance compared to D-BLAST mainly due to the self-generated error propagation problem that limited its performance.

Many solutions have been proposed since then that attempted to reconcile the performance of V-BLAST with that of the near-optimal performance of D-BLAST. Most of these solutions focused on mitigating the effects of the error propagation problem, but they did so by adding complexity to V-BLAST to the point where the added complexity made the new V-BLAST based solution unattractive for practical implementation.

V-BLAST (and its variants) focus mainly on maximizing the multiplexing gain (i.e. data rate) while most other space-time codes focus on maximizing diversity gain (i.e. reliability). The optimum solution seems to lie in a hybrid approach (See *Conclusion*, David Gesbert, Mansoor Shafi, and Da shan Shiu, *From theory to practice: An overview of MIMO space-time coded wireless systems*, IEEE Journal 21 (2003), no. 3, 281-302). So an optimal trade off is needed (optimal trade off can be measured according to Lizhong Zheng, *Diversity and Multiplexing: A Fundamental Tradeoff in Multiple-Antenna Channels*, IEEE Transactions on Information Theory, Vol. 49, No. 5, (2003)).

V-BLAST (and its variants) and other space-time codes do not account for channel correlation that normally exists in practice. Channel correlation tends to heavily degrade the performance of these systems.

So complexity reduction, correlation reduction, and diversity-multiplexing trade off are still an open problem in MIMO communications.

Therefore, there is a need for improved systems, apparatus, and techniques for signal detection techniques n a MIMO communication system.

SUMMARY

The present invention includes methods, apparatuses, and systems as described in the written description and claims. In one example, an N×N MIMO detection algorithm exploits the powerful diversity coding advantage offered by the space-time code along with the computational advantage offered by the QR matrix factorization.

In one embodiment, a method of detecting signals in a MIMO communication system includes receiving symbols coded into pairs using a space-time code. Estimating a channel matrix that identifies the response between multiple transmit and receive antennas in the MIMO communication system. Performing a QR factorization on the channel matrix to obtain Q and R matrices. Determining a receive vector corresponding to a plurality of transmitted symbols received by the multiple receive antennas and transforming the receive vector based upon the Q matrix. Estimating a value of at least two received symbols to determine at least two estimated symbols. Then removing a contribution of the estimated symbols from the receive vector to determine a revised received vector. Estimating a value of at least two additional received symbols to determine at least two additional estimated symbols.

In another aspect the space-time code is a 2×2 space-time code. For example, an Alamouti code. Another aspect includes estimating a value of at least two received symbols using a hard decision estimate of at least two received symbols. An additional aspect of transforming the received vector includes multiplying the received vector by a hermitian conjugate of the Q matrix.

In another embodiment, detecting signals in a MIMO communication system includes receiving symbols coded to be transmitted into pairs using a space-time code. Estimating a channel matrix that identifies the response between multiple transmit and receive antennas in the MIMO communication system. Performing a plurality of QR factorization on the channel matrix to obtain a plurality of Q and R matrices. Determining a receive vector corresponding to a plurality of transmitted symbols received by the multiple receive antennas. Performing a plurality of transformations of the receive vector based upon the plurality of Q matrices. Estimating a value of at least two received symbols for each of the plurality of transformations to determine at least two estimated symbols. Then removing a contribution of the estimated symbols from the receive vector to determine a revised received vector for each of the transformations. Estimating a value of at least two additional received symbols for each of the plurality of transformations to determine at least two additional estimated symbols.

In another aspect, performing the plurality of QR factorizations includes permuting columns in the channel matrix.

In yet another embodiment, detecting signals transmitted from multiple transmit antennas generated from symbol pairs that are space-time coded in a receiver having multiple receive antennas includes determining a channel matrix that identifies the response between the multiple transmit and receive antennas. Transforming the channel matrix to a virtual channel. Performing partial spatial filtering based upon the virtual channel on received signals. Performing space-time decoding on the received signals. Making decision estimates of symbols represented by at least one of the received signals. Performing interference cancellation using the at least one estimated symbol.

In another aspect partial spatial filtering and interference cancellation are repeated.

In still another embodiment, detecting signals transmitted from multiple transmit antennas generated from symbol pairs that are space-time coded in a receiver having multiple receive antennas includes determining a channel matrix that identifies the response between the multiple transmit and receive antennas. Transforming the channel matrix to a virtual channel. Performing partial spatial filtering based upon the virtual channel on received signals. Performing space-time decoding on the received signals. Making decision estimates of pairs of symbols received through receive antennas having the maximum distance between them. Performing interference cancellation using the at least one estimated symbol, and the distance between their respective antennas is maximized.

Other features and advantages of the present invention should be apparent after reviewing the following detailed description and accompanying drawings which illustrate, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts.

DETAILED DESCRIPTION

Certain embodiments as disclosed herein provide for methods and systems for MIMO detection techniques. After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

In one example, an N×N MIMO detection method utilizes both spatial filtering and interference cancellation on received signals that had been space-time coded.

Figure 1:
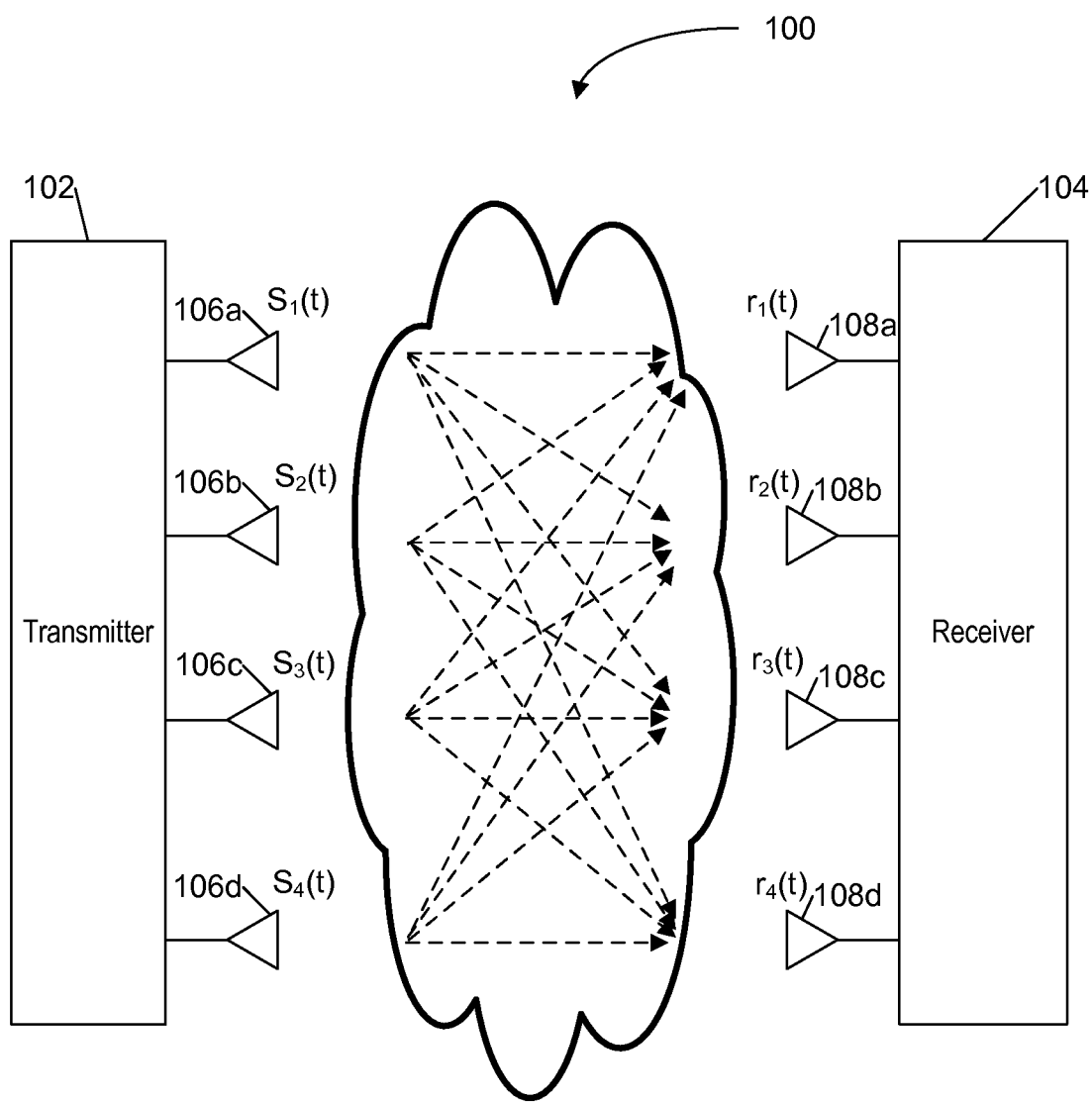
FIG. 1 is a block diagram that illustrates an example embodiment of a 4×4 MIMO system.

In one embodiment, to increase data transfer rates at fixed transmit power levels using the same frequency band, multiple transmit (TX) and receive (RX) antennas are employed, and signals at the transmitter and/or receiver are processed in a manner that exploits the temporal and spatial properties of the wireless channel. See, for example, G. J. Foschini and M. J. Gans, *On limits of wireless communications in a fading environment when using multiple antennas*, Wireless Personal Comm. 6 (1998), no. 3, 311335; I. E. Telatar, *Capacity of multi-antenna gaussian channels*, European Trans. Telecom. 10 (1999), no. 6, 585-595. Systems that employ such space-time signal processing techniques to increase throughput are referred to as Multiple-Input-Multiple-Output (MIMO) systems. FIG. 1 is a block diagram that illustrates an example embodiment of a 4×4 MIMO system 100. As shown in the example of FIG. 1, the MIMO system includes a transmitter module 102 and a receiver module 104. The transmit module 102 includes four transmit antennas 106a-d and the receive module 104 includes four receive antennas 108a-d. The 4×4 MIMO system can be modeled where $s_j$ represents the transmitted signal from TX antenna j (j=1, 2, 3, 4), and $r_i$ represents the received signal at RX antenna I (i=1, 2, 3, 4).

Unlike a Single-Input-Single-Output (SISO) wireless link, where the wireless channel is typically modeled as a single impulse response, modeling the MIMO baseband wireless channel consists of a matrix, referred to as H, with random entries $h_{ij}$ representing the impulse response from the j-th TX antenna to the i-th RX antenna.

For practical reasons, the following analysis is primarily addresses a symmetrical case where $N_R$, the number of RX antennas, is equal to $N_T$, the number of TX antennas, i.e. $N_R=N_T=N$. However, it can be applied to non-symmetrical cases also. In addition, the analysis considers an uncorrelated block flat-fading Rayleigh channel case, i.e. entries $h_{ij}$ are identically and independently distributed (i.i.d.) complex Gaussian scalars assumed to be static during an entire burst of the transmit signal. Frequency-selective channels can be made to look flat for each TX antenna signal by either employing time-domain equalization techniques in the receiver or by use of OFDM techniques.

It has been shown that the channel capacity (measured in bits/s/Hz) that can be achieved by a typical MIMO link depends on the statistical properties of H, with the greatest capacity offered when the various $h_{ij}$ gains are uncorrelated with each other. (See, *On limits of wireless communications in a fading environment when using multiple antennas*, Supra; *Capacity of multi-antenna gaussian channels*, supra). Thus, typically the best achievable capacity is offered when the channel correlation matrix $E(H^+H)$ is equal to a diagonal matrix. Rarely is this the case in real-world channels, but the rich scattering that naturally exists in many environments, for example in indoor and dense urban environments, greatly help synthesize such a channel. In other words, MIMO exploits multipath to its advantage as opposed to traditional communication systems that attempt to mitigate multipath effects.

Many decoding techniques have been proposed that attempted to achieve the dormant capacity offered by the MIMO channel. Some of the best known techniques are Diagonal Bell Labs Layered Space-Time G. J Foschini, *Layered space-time architecture for wireless communication in a fading environment when using multiple antennas*, Bell Lab. Tech. J. 1 (1996), no. 2, 41-59, also known as D-BLAST, and Vertical Bell Labs Layered Space-Time G. D. Golden, G. J. Foschini, R. A. Valenzuela, and P. W. Wolniansky, *Detection algorithm and initial laboratory results using the V-BLAST spacetime communication architecture*, Electron. Lett., 35 (1999), no. 1, 14-15, or V-BLAST (whose original implementation was based on the Zero Forcing (ZF) nulling method as opposed to the better performing Minimum Mean Square Error (MMSE) based nulling approach). Most techniques that have been proposed later are variations of these two techniques. In evaluating Bit Error Rate (BER) performance of these techniques the spatial Maximum Likelihood (ML) receiver, which typically has the optimum BER performance, is generally used as a reference for the best asymptotic performance. It is noted that the ML detector computational complexity is $O(K^{N_T})$ where K is the constellation order. Therefore, it is typically only feasible to implement it in practice when both K and $N_T$ have relatively small values.

While the performance of the D-BLAST technique is generally superior to the ZF V-BLAST technique, it is more costly to implement in practice. (See, *Detection algorithm and initial laboratory results using the V-BLAST spacetime communication architecture*, supra). On the other hand the ZF V-BLAST technique is relatively less complex but it suffers in BER performance compared to D-BLAST, mainly due to a self-generated error propagation problem that tends to degrade its overall performance. Solutions have been proposed to address this problem but these solutions add complexity to V-BLAST to a point where the increased complexity defeats the purpose for which V-BLAST was proposed in the first place. (See, for example, Won-Joon Choi, R. Negi, and J. M Cioffi, *Combined ML and DFE decoding for the V-BLAST system*, ICC 2000 3 (2000))

Another technique, MMSE V-BLAST which is a variation of the V-BLAST technique, has complexity requirements that are similar to that of ZF V-BLAST. The MMSE V-BLAST technique requires knowledge or an estimate of the variance of noise present at each RX branch. This techniques is limited because knowing, or estimating the noise variance many not be possible in many applications, and even if it is possible its estimated value is rarely accurate.

The various embodiments of the systems and methods described below provide various combinations of desirable aspects that include the following:
- Achieves ML-like (or better) BER performance with reasonable complexity and without knowledge of noise variance.
- Its complexity does not depend on the modulation order used (as is the case in ML detection) or on the target SNR (as is the case in ML-like sphere decoding algorithms).
- Does not suffer from the noise enhancement problem and greatly reduces the effect of the error propagation problem (EPP) usually associated with V-BLAST family of algorithms.
- Its improved performance is not attained through the use of more RX antennas compared to the number of TX antennas (as is the case in V-BLAST).
- Is numerically stable and does not break down when the channel matrix is ill-conditioned (which mainly occurs when heavy correlation exists between antenna elements as is the case in densely packed antenna elements).

In one embodiment, a system and method is described that exploits the diversity advantage of a space-time code, and the numerical stability and reduced complexity of a channel matrix such as QL or QR decomposition. As described further below, the technique does not suffer from the noise enhancement problem and greatly reduces the effect of the error propagation problem, both of which pose a performance bottleneck in the V-BLAST family of techniques.

MIMO Capacity and Detection Techniques

The following describes an analysis of and N×N MIMO system in discrete-time baseband, thereby eliminating dependency on the carrier frequency component from the analysis. For ease of exposition, and because it is assumed that the channel matrix H is static over the burst duration, the dependency on time is also eliminated.

MIMO System Model and Channel Capacity

Referring again to FIG. 1, the received signal vector $y=[y_1\ y_2 \ldots y_N]^T$ can be expressed as follows:

$$y = \sqrt{\frac{\rho}{N}} Hs + n \qquad \text{(Equation 1)}$$

$$= \sqrt{\frac{\rho}{N}} (h_1 s_1 + h_2 s_2 + \ldots + h_N s_N) + n,$$

where: H is the N×N channel matrix whose elements $h_{ij}$ represent the complex gains between TX antenna j and RX antenna i;
$s=[s_1\ s_2 \ldots s_N]^T$ is the TX vector with each component representing a symbol, generally complex, belonging to a finite set of symbol alphabet $a=[a_1\ a_2 \ldots a_K]$ with $$\frac{1}{k}\sum_{i=1}^{K} |a_i|^2 = 1;$$

and $n=[n_1\ n_2 \ldots n_K]^T$ represents the noise vector at the input to the receiver with elements $n_i$ that are assumed to be uncorrelated with $s_j$ and between themselves, i.e. $E(nn^+)=I_N$, where $E(.)$ denotes the expectation operator.

The normalization factor $$\sqrt{\frac{\rho}{N}}$$

ensures that the total transmit power is always constrained to 1, and the average receive SNR per branch is ρ. The second form of the equation uses the columns of the channel matrix, i.e. $h_j=[h_{1j}\ h_{2j}\ h_{Nj}]^T$ (j=1, 2, ... N). It is assumed the receiver has full knowledge of H but the transmitter has no prior knowledge of it.

To determine how much capacity the MIMO channel offers, the asymptotic MIMO channel capacity results are derived (See, for example I. E. Telatar, *Capacity of multi-antenna gaussian channels*, European Trans. Telecom. 10 (1999), no. 6, 585-595 and G. J. Foschini and M. J. Gans, *On limits of wireless communications in a fading environment when using multiple antennas*, Wireless Personal Comm. 6 (1998), no. 3, 311335). The ergodic (temporal mean) capacity C of the random channel matrix H can be computed as follows:

$$\overline{C} = E\left\{\log_2 \det\left(I_{N_R} + \frac{\rho}{N_T} HH^+\right)\right\} \text{ bits/s/Hz,} \qquad \text{(Equation 2)}$$

where: det(.) is the determinant operator and $H^+$ is the hermitian conjugate of H.

It can be shown (See, David Gesbert, Mansoor Shafi, and Da shan Shiu, *From theory to practice: An overview of MIMO space-time coded sireless systems*, IEEE Journal 21 (2003), no. 3, 281-302) that the maximum MIMO channel capacity is achieved when $E(HH^+)$ is a diagonal matrix, i.e. the different channel gains are uncorrelated and of equal magnitude.

Figure 2:
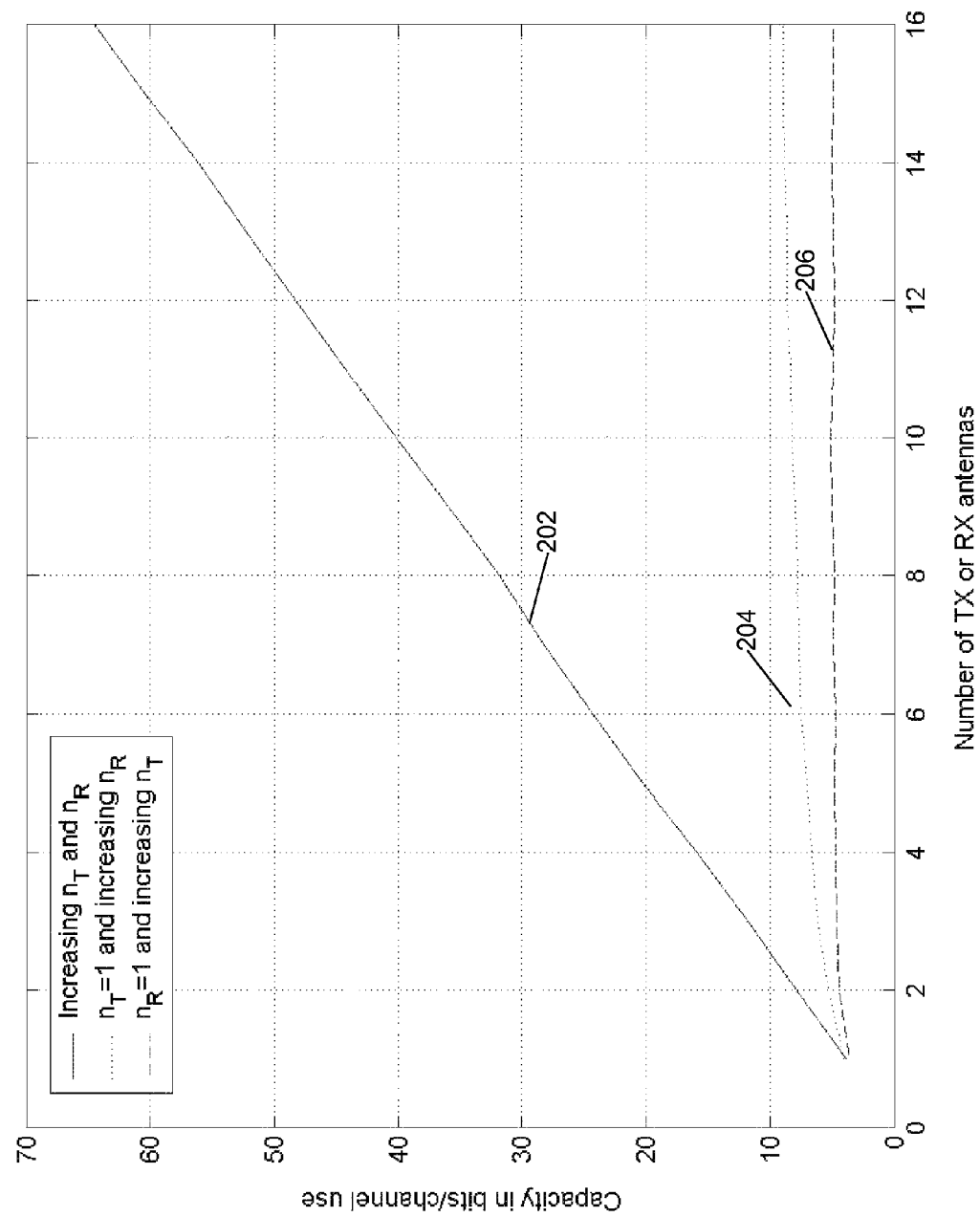
FIG. 2 is a chart showing the ergodic capacity curves for various values of the number of transmit (NT) and receive (NR) antennas at an average receive signal-to-noise ratio ρ of 15 dB.

FIG. 2 is a chart showing the ergodic capacity curves for various values of the number of transmit ($N_T$) and receive ($N_R$) antennas at an average receive signal-to-noise ratio ρ of 15 dB. FIG. 2 illustrates three different examples, one where the number of transmit and receive antennas are equal 202, another where there is one transmit antenna and multiple receive antennas 204, and another where there is one receive antenna and multiple transmit antennas 206. As illustrated in FIG. 2, the theoretical capacity offered by the MIMO channel is limitless, and to realize it the number of antennas on both ends of the MIMO link must be increased. Increasing the number of antennas on one end offers only marginal increase in capacity (i.e. similar to the one offered by traditional array systems). Note that equation 2, similar to the Shannon theory for the SISO AWGN channel, does not reveal how to achieve this capacity.

Measurements conducted in a dense urban environment, show that the capacity offered by fixed-wireless MIMO channels is around 80% of the theoretical uncorrelated case (See G. J. Foschini et al, *Analysis and performance of some basic space-time architectures*, IEEE Journal Selected Areas in Comm. 21 (2003), no. 3, 281-320). This suggests that real-world wireless MIMO channel complex gains have some degree of correlation between themselves.

Because the V-BLAST technique relies on the assumption that previous decoded symbols were detected correctly, it runs the risk of carrying (or propagating) additional "noise" terms (in addition to n) from that step onward. This makes the first few steps of the decoding process very important for its overall performance. This deficiency in the V-BLAST decoding technique is referred to in the literature as the error propagation problem. Systems and methods are described below where the error propagation problem has a greatly reduced effect.

When designing MIMO detection algorithms, there are usually two competing objectives to meet: data rate maximization; and diversity maximization. The BLAST-type techniques are usually designed to meet the data rate maximization objective using spatial multiplexing. That is, the data at the transmitter is multiplexed and sent independently over different antennas. For example, a 2×2 V-BLAST system can send 4 bits/s/Hz by employing QPSK modulation in each sub-channel.

In contrast to standard BLAST-type detection, space-time coding techniques, such as Alamouti space-time coding, focus on maximizing diversity in fading environments. That is, the same symbol (or a transformed form of it) that was transmitted at time t is retransmitted from different antennas at times t+i (i=1, 2, ... K−1), hence reducing the probability that a given symbol is completely lost. The probability is reduced given that the fading each sub-channel undergoes is independent of the other which is generally the case when antenna elements are sufficiently spaced apart, e.g., inter-element distance is greater than a half-wavelength.

While it is true that the amount of transmitted symbols in a given frame is reduced by one-half of the code rate, the diversity gain achieved usually allows use of higher order modulation to compensate for rate loss. Using the above example one can, for instance, employ 16QAM in each sub-channel when a space-time code of rate 1 is used.

A typical Alamouti Space-Time Block Code (STBC) is a rate 1 space-time code. Not only does it achieve ML detection with high order of diversity, it also allows the use of linear processing techniques at the receiver, hence greatly reducing the baseband processing requirements. (See S. M. Alamouti, *A simple transmit diversity technique for wireless communications*, IEEE Journal on Selected Areas in Communications 16 (1998), no. 8, 1451-1458 and *From theory to practice: An overview of MIMO space-time coded wireless systems*, Supra). This feature makes it particularly attractive for terminals, or subscriber stations, that have limited power capabilities, for example, battery-powered terminals. The use of the rate-1 2×2 Alamouti code is only for illustration purposes. Other advanced rate-2 2×2 non-orthogonal space-time codes can be used instead. The use of these non-orthogonal codes will generally give better performance (of course at the expense of adding more decoding complexity).

Figure 3:
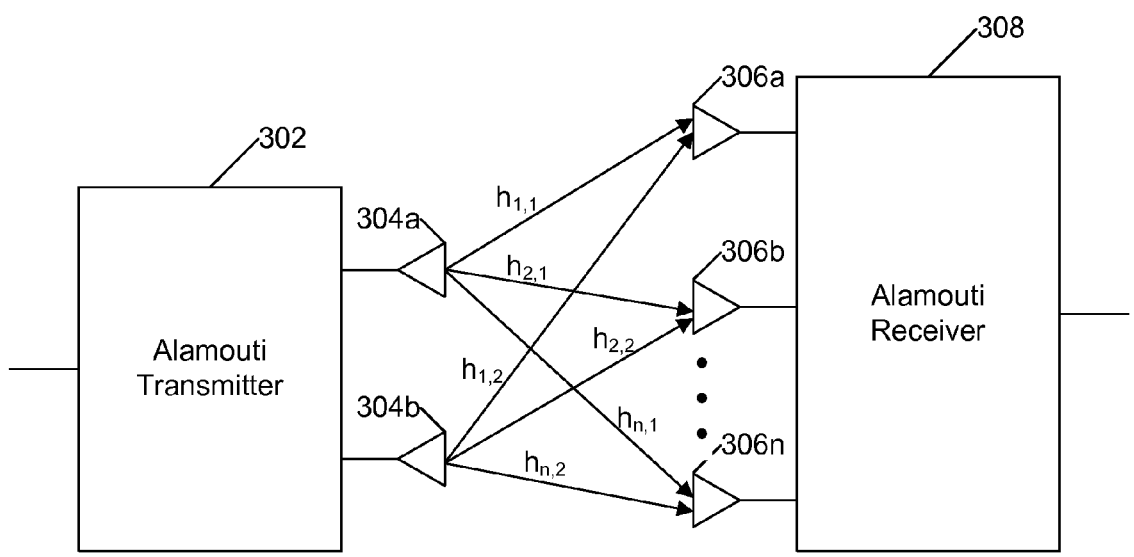
FIG. 3 is a block diagram of a 2×N MIMO system.

FIG. 3 is a block diagram of a 2×N MIMO system. As shown in FIG. 2, an Alamouti transmitter module 302 communicates symbols to two transmit antennas 304a-b. Signals transmitted by the transmit antennas 304a-b are received at receiver antennas 306a-n. The received signals are communicated to an Alamouti receiver module 308 that processes the received signals to recover the transmitted symbols.

A drawback of the Alamouti technique is that it can not be generalized to the general N×N MIMO case without sacrificing on the code rate. To help understand how the Alamouti space-time code achieves a high order of diversity with linear processing at the receiver, the fundamental equations used by the algorithm are shown below. The Alamouti transmit module 302 processing includes transmitting the following simple space-time code:

$$C_{2,2} = \begin{bmatrix} s_1 & s_2 \\ -s_2^* & s_1^* \end{bmatrix} \quad \text{(Equation 9)}$$

The columns of this space-time code represent space dimension while the rows represent time dimension. That is, at time t odd-indexed symbols are transmitted from the first antenna while even-indexed ones are transmitted from the second antenna. At time t+1, the complex conjugate of the even-indexed symbols with opposite polarity are transmitted from the first antenna while the complex conjugate of the odd-indexed symbols are transmitted from the second antenna. The received vector at RX antenna i can be expressed as follows:

$$\begin{bmatrix} y_{1,i} \\ y_{2,i} \end{bmatrix} = \sqrt{\frac{\rho}{N}} \begin{bmatrix} s_1 & s_2 \\ -s_2^* & s_1^* \end{bmatrix} \begin{bmatrix} h_{i,1} \\ h_{i,2} \end{bmatrix} + \begin{bmatrix} n_{i,1} \\ n_{i,2} \end{bmatrix}, \quad \text{(Equation 10)}$$

$$i = 1, 2, \ldots N$$

or written differently $$\begin{bmatrix} y_{1,i} \\ y_{2,i}^* \end{bmatrix} = \sqrt{\frac{\rho}{2}} \underbrace{\begin{bmatrix} h_{i,1} & h_{i,2} \\ h_{i,2}^* & -h_{i,1}^* \end{bmatrix}}_{H_i} \underbrace{\begin{bmatrix} s_1 \\ s_2 \end{bmatrix}}_{s} + \underbrace{\begin{bmatrix} n_{1,i} \\ n_{2,i}^* \end{bmatrix}}_{n_i}, \quad \text{(Equation 11)}$$

$$i = 1, 2, \ldots, N$$

It can be shown that $H_i$ is orthogonal, i.e. $H_i^+ H_i = (|h_{i,1}|^2 + |h_{i,2}|^2) I_{2,2}$. This property allows the use of linear processing at the receiver. For example, multiplying the received vector in equation 11 by $H_i^+$ produces the following pre-detection estimate:

$$\hat{s} = \sqrt{\frac{\rho}{2} \sum_{i=1}^{N} (|h_{i,1}|^2 + |h_{i,2}|^2) s} + \sum_{i=1}^{N} \tilde{n}_i \quad \text{(Equation 12)}$$

Examination of Equation 12 shows that the Alamouti transmit and receive processing automatically eliminates MSI and adds the symbol energy coherently while adding the noise components incoherently. It is noted that this is done without resorting to matrix inversion, hence eliminating the noise amplification problem associated with the V-BLAST techniques. Also, it is noted that the diversity order achieved by the Alamouti space-time code is equal to 2×N.

As noted above, in designing MIMO detection systems there are usually two competing goals: data rate maximization and diversity maximization. In one embodiment, a MIMO detection system and method is described that extends the benefits associated with the 2×2 Alamouti STBC features to the general N×N case. The general N×N case can be achieved if interference from certain TX antennas are eliminated. The systems and methods can do this without amplifying noise. This method and systems can reach an optimal trade off between maximizing diversity gain and maximizing multiplexing gain for a 4×4 MIMO system.

In one embodiment, use of a QR matrix decomposition eliminates some interference without resorting to matrix inversion. Operation of the decomposition is explained further below:

Any matrix H can be decomposed as H=QR, where Q is unitary, i.e. $Q^+Q=I$, and $$R = \begin{bmatrix} r_{11} & r_{12} & \cdots & r_{1N} \\ 0 & r_{22} & \cdots & r_{2N} \\ \vdots & \vdots & \ddots & \vdots \\ 0 & 0 & \cdots & r_{NN} \end{bmatrix} \quad \text{(Equation 13)}$$

is an upper triangular matrix.

Using QR decomposition Equation (3) can then be rewritten as $$y = \sqrt{\frac{\rho}{N}} QRs + n \quad \text{(Equation 14)}$$

By multiplying the RX vector y from the left by $Q^+$ we get the following transformed vector $$\tilde{y} = \sqrt{\frac{\rho}{N}} Rs + \tilde{n} \quad \text{(Equation 15)}$$

$$= \sqrt{\frac{\rho}{N}} (r_1 s_1 + r_2 s_2 + \ldots + r_N s_N) + \tilde{n},$$

where the property that $Q^+Q=I$ has been used.

It is noted that all $\tilde{n}_i$ still have zero mean and unity variance, i.e. no noise amplification takes place. It can also be verified that R has the same eigenvalue spread as H, and finding Q and R is always possible even when H is ill-conditioned. i.e. when its eigenvalue spread is extremely large. This is in contrast to matrix inversion where the inverse may not exist in many situations (for example when heavy correlation exists in the channel). This problem may be compounded in limited-precision processors. Another advantage of using QR decomposition is its numerical stability.

Figure 4:
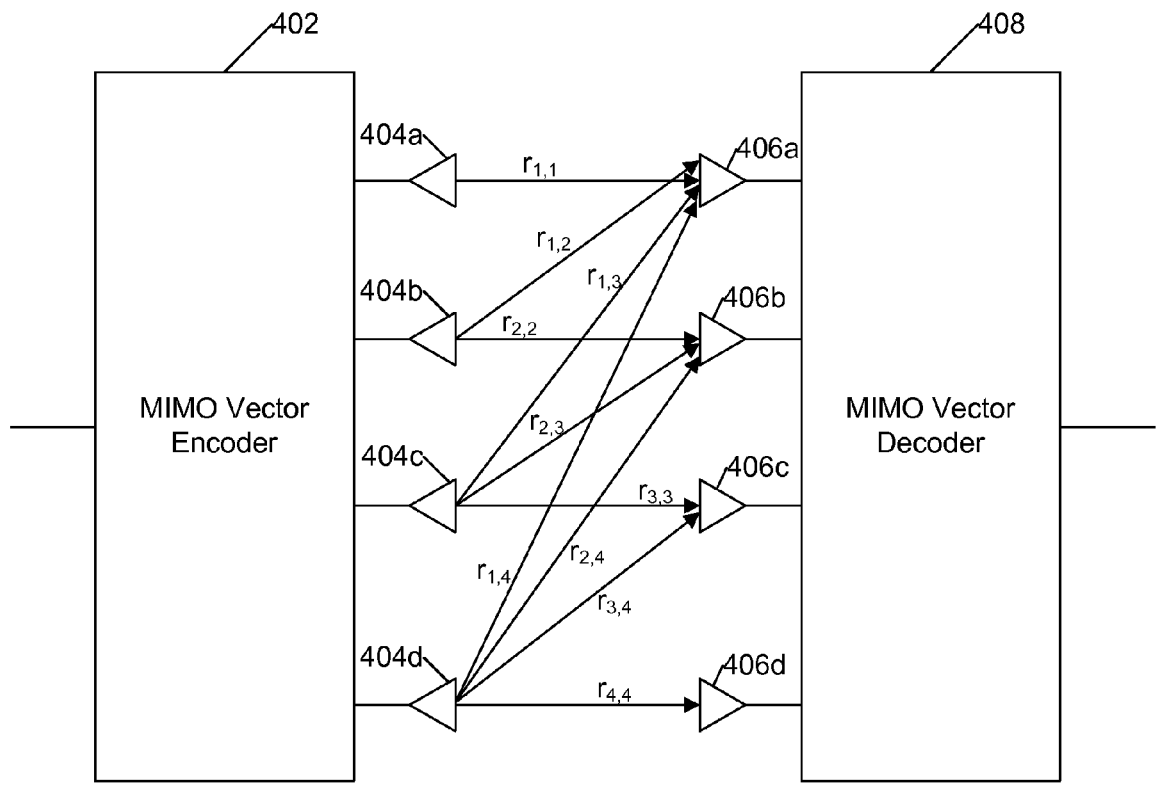
FIG. 4 is a block diagram of an example embodiment of a 4×4 MIMO system with QR decomposition, where the R matrix replaces channel matrix H.

FIG. 4 is a block diagram of an example embodiment of a 4×4 MIMO system with a decomposition that lends its self to solving linear equations, for example, QR decomposition and QL decomposition. The system depicted in FIG. 4 is described using the example of QR decomposition. As shown in FIG. 4, the system includes a MIMO vector encoder 402 in communication with four antennas 404a-c that transmit signals. The transmitted signals are received by four antennas 406a-d that are in communication with a MIMO vector decoder 408.

One beneficial aspect of the QR factorization, or decompostion, is that it allows for reformulation of the MIMO detection problem using a "virtual" channel matrix R rather than the actual channel matrix H. As shown in FIG. 4, the 4×4 MIMO system model uses R as the channel matrix. In FIG. 4 it is shown that the QR transformation has performed partial spatial filtering which eliminates interference from certain transmit antennas. Of particular interest are the bottom two receive antennas 406c and 406d. These antennas now "see" contributions only from the bottom two transmit antennas 404c and 404d. It is noted that even though the description is for a 4×4 MIMO case, the same is also true for the general N×N case.

Another aspect of using the QR decomposition is that it can obtain different Q and R matrices by permuting the columns of H for a total number of N! QR decompositions (only N of which are completely independent in an uncoded system and N/2 when the transmit signals are space-time coded in pairs). For example a 4×4 MIMO channel matrix can have 24 different QR decompositions, (4 of which are completely independent in an uncoded system and 2 when the transmit signals are space-time coded in pairs). As described further below, this property allows improved performance of the technique at the expense of adding more complexity. In the following description, unless otherwise specified Q and R will refer to the matrices obtained with the default permutation, i.e. Q(1, 2, 3, 4) and R(1, 2, 3, 4) for a 4×4 MIMO system. In the sequel we will use index p to represent the $P^{th}$ permutation.

Figure 5:
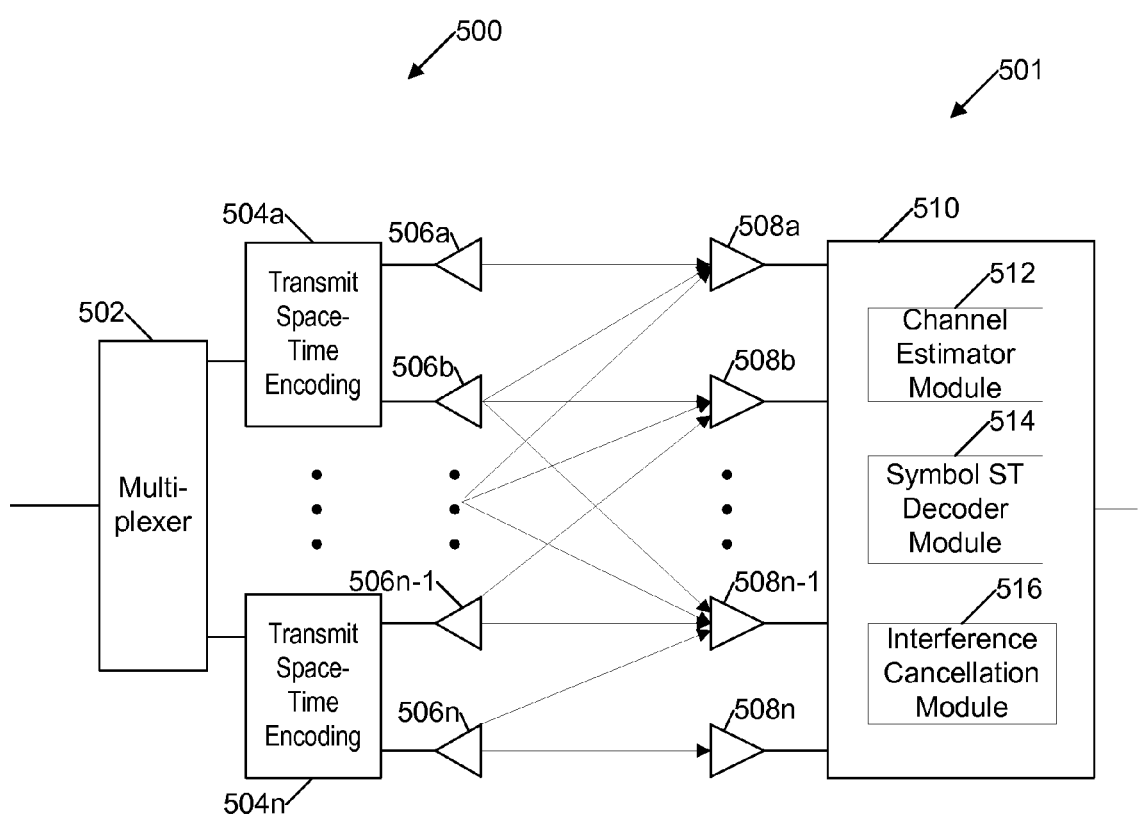
FIG. 5 is a block diagram illustrating an example embodiment of a model of an N×N MIMO detection system.

FIG. 5 is a block diagram illustrating an example embodiment of a MIMO detection system. As shown in FIG. 5, there is a transmitter 500 and a receiver 501. Selective portions of the transmitter 500 are illustrated in FIG. 5 and include a multiplexer 502 which receives symbols and routes pairs of symbols to a plurality of space-time encoding transmit modules 504a-n, for example, encoders employing the Alamouti code. The Alamouti space-time code is applied to the transmitted symbols in pairs of two as shown in FIG. 5. The encoded symbols are communicated to a plurality of transmit antennas 506a-n in the transmitter 500. FIG. 5 shows selective portions of the receiver 501 and include a plurality of receive antennas 506a-n that receive the signals transmitted by the transmit antennas 506a-n. The signals from the receive antennas 508a-n are communicated to receive module 510. Selective portions of the receive module 510 are shown, and include a channel estimator module 512, a symbol space time (ST) decoder module 514, and an interference cancellation module 516. In one embodiment, the symbol space-time decoder module is a 2×2 space-time decoder, for example, an Alamouti decoder. However, other advanced rate-2 2×2 non-orthogonal space-time codes can be used instead.

Figure 6A:
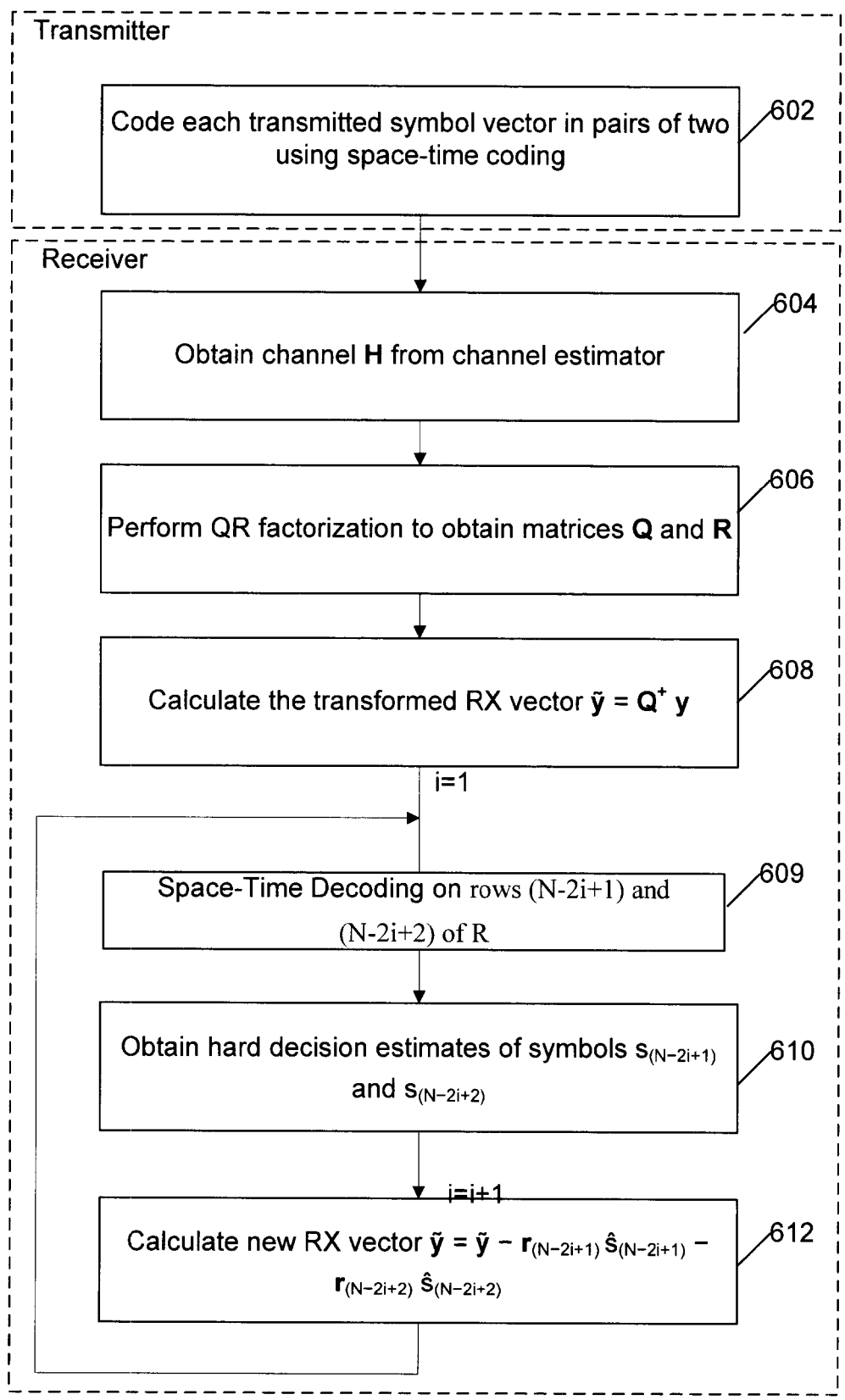
FIG. 6A is a flow chart illustrating an example embodiment of MIMO detection.

FIG. 6A is a flow chart illustrating an example embodiment of MIMO detection which can be implemented, for example, in the system shown in FIG. 5. Flow begins in block 602 where each transmitted symbol pairs are coded in pairs of two using Alamouti space-time code, and the coded pairs are transmitted. Alternatively, other advanced rate-2 2×2 non-orthogonal space-time codes can be used instead. In one embodiment, the operations of block 602 are performed in the transmitter 500 of FIG. 5 and the remaining operations of FIG. 6 are performed in the receiver 501.

Flow continues to block 604 where a channel matrix H is determined, for example, by a channel estimator (item 512 of FIG. 5). Flow continues to block 606 and a QR decomposition, or factorization, is performed to determine Q and R matrices. This can be performed, for example, by the channel estimation 512 or the interference cancellation module 516. Flow continues to block 608 where partial spatial filtering is performed, for example by calculating the transformed RX vector $\tilde{y}=Q^+y$ (here $(.)^+$ represents hermitian conjugate operator). Flow continues to block 609 and space-time decoding is performed (item 514 of FIG. 5). In one embodiment, the operations of block 609 are not performed. Flow then continues to block 610 and hard decision estimates of symbols $s_{(N-2i+1)}$ and $s_{(N-2i+2)}$ (i=1, 2, ... N) are obtained. In one embodiment, the estimates are obtained by a symbol space-time decoder (item 514 of FIG. 5). Flow continues to block 612 when interference cancellation is performed, for example, by calculating a new receive vector $\tilde{y}=\tilde{y}-r_{(N-2i+1)}\hat{s}_{(N-2i+1)}-r_{(N-2i+2)}\hat{s}_{(N-2i+2)}$. In one embodiment, the new, or revised, receive vector is calculated in an interference cancellation module (item 516 of FIG. 5). For example, the calculating the revised receive vector comprises removing the contribution of the estimated symbols from the receive vector. Flow continues and blocks 610 and 612 are repeated such that hard decision estimates and new receive vectors are calculated $$\frac{N}{2}$$

times in total. In one embodiment, the operations of blocks 609-612 are performed only once, or a selected umber of times.

It can be seen that the diversity enjoyed by the last two symbols is equal to three. The first two symbols enjoy almost the same diversity as the hard decision statistics for the last two symbols and are extremely reliable. The diversity gain generally increases with the number of performed QR decompositions.

Figure 6B:
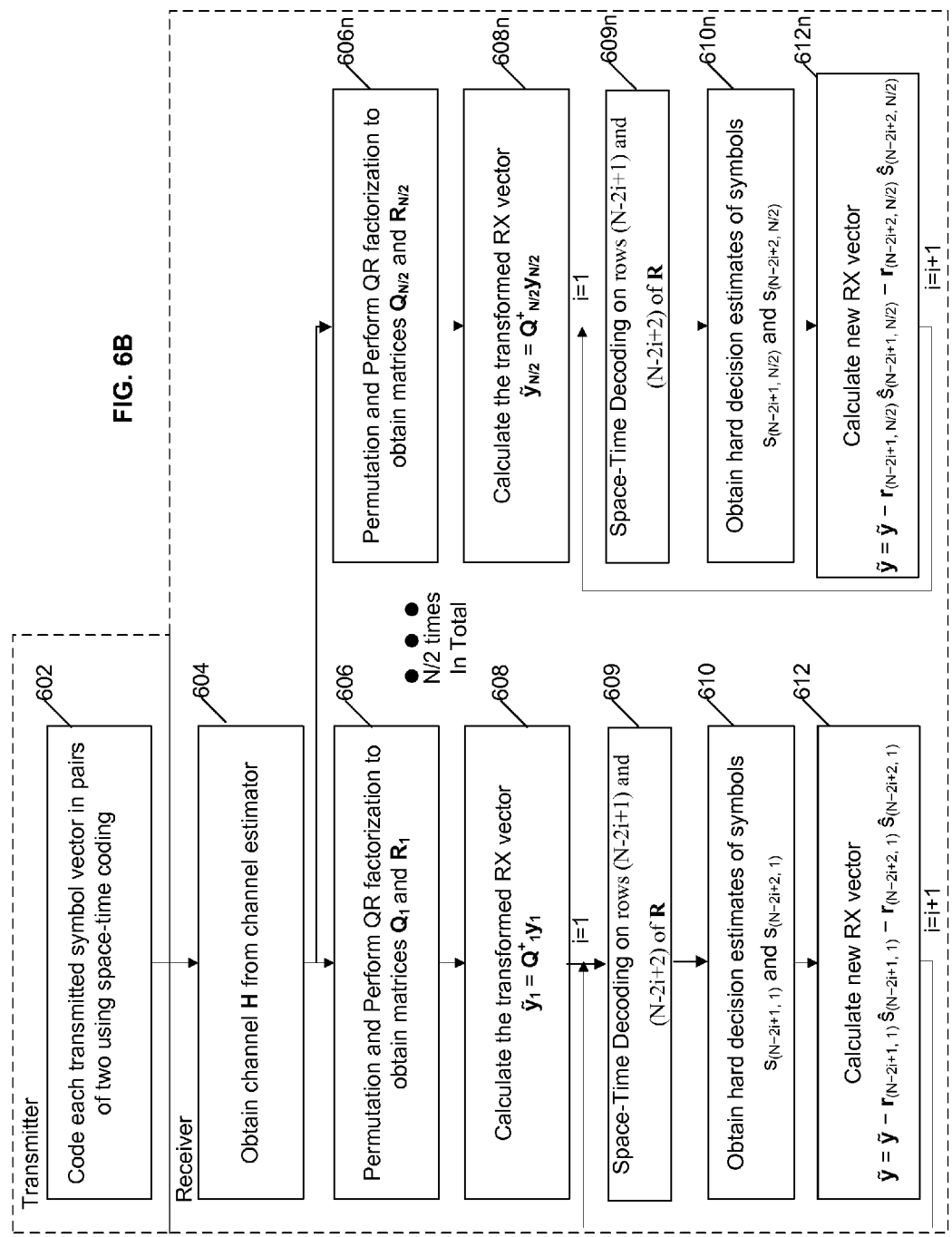
FIG. 6B is a flow chart illustrating another example embodiment of MIMO detection.

FIG. 6B is a flow chart illustrating another example embodiment of MIMO detection which can also be complemented in the system of FIG. 5 by the changes noted. In the embodiment of FIG. 6B, the same basic operations as described in FIG. 6A are performed. In the embodiment of FIG. 6B, additional matrix factorizations are computed and steps 606n-612n are performed similarly to steps 606-612 described in FIG. 6A to obtain better estimates. For example, the last two columns of the matrix can be permuted with the first two columns to obtain Q(3, 4, 1, 2) and R(3, 4, 1, 2). In this way the first two symbols decoded using this permutation correspond to symbols 1 and 2. Thus, at this stage there are already soft estimates of all the transmitted symbols available. In delay-sensitive applications the process may stop here and pass on those estimates (in hard or soft form) for further processing. In delay-tolerant applications the process can continue until the end of next stage and average the soft estimates to obtain better decision statistics. In addition, turbo techniques can be used to obtain even further improvement.

In embodiments of MIMO communication systems, there are various geometries that can be chosen with regard to placement of the antennas. Examples of geometries include linear, rectangular, and circular, to name a few. Typically, correlation between antenna elements affect MIMO system performance negatively. Reasons for an increase in correlation between antenna array elements include the environment the system is operating in as well as the spacing of the elements. Poor scattering in the surrounding environment, such as in urban and rural environments, can increase the correlation. This is in contrast to environments such as indoor environments which are generally very rich in scattering, and thus generally decrease the correlation between antenna elements.

Also, as the distance between antenna elements decreases there is generally an increase in correlation. In general, the distance between antenna array elements is preferably at least a half-wave length (more is generally better). For example, a half-wave length is anywhere between 2.6 cm to 6.25 cm for 2.4 GHz to 5.8 GHz frequencies respectively. While the physical distance between antenna array elements on a base station, or access point, may not be a major constraint, the physical distance on the terminal side may be an issue. For example, if the terminal is a cell phone or a personal data assistant (PDA) it may not be practical to have large separation between antenna elements. So, on one hand, it would be beneficial to include more antennas on a terminal to increase throughput, but on the other hand limited physical space makes separation difficult and thus there is increased correlation. So a fundamental problem is that given a limited physical space how best to maximize distance between antenna array elements.

In one embodiment, utilizing the systems and methods described above signals are paired (and jointly space-time encoded) and the distance between their respective antennas is maximized. Also because the error propagation problem can be significantly reduced it makes sense to choose the maximum distance for the pairs that are decoded first. Though the following examples address the systems and methods in terms of receiving signals, they also apply to transmitting.

Figure 7A:
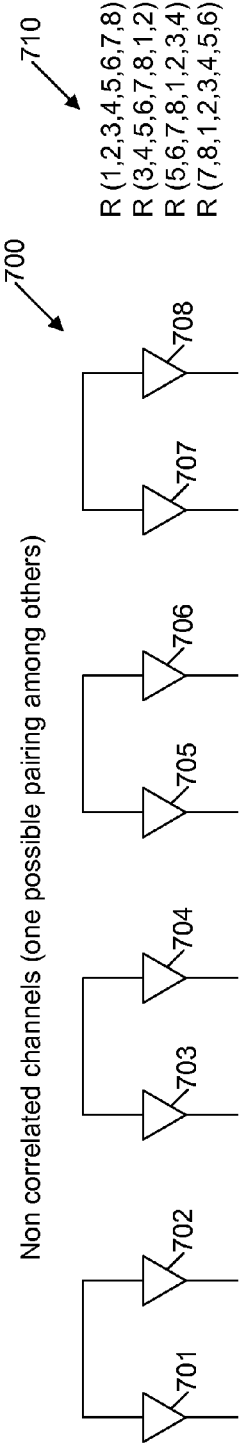
FIG. 7A is a block diagram illustrating an example of pairing of antenna elements in a linear antenna array.

FIG. 7A is a block diagram illustrating an example of pairing of antenna elements in a linear antenna array 700. As shown in the example of FIG. 7A, there are eight antenna elements 701-108. In a non-correlated channel environment the antenna elements 701-708 may be paired, for example, as shown in FIG. 7A where adjacent antenna elements are paired together. For example, the first and second antenna elements 701 and 702 are paired together, the third and fourth antenna elements 703 and 704 are paired together, the fifth and sixth antenna elements 705 and 706 are paired together, and the seventh and eight antenna elements 707 and 708 are paired together. In the example of FIG. 7A, because there is no, or low, correlation between the channels the separation between the antenna elements is less of a factor in system performance. The antenna configuration illustrated in FIG. 7A has four sample R matrices 710.

Figure 7B:
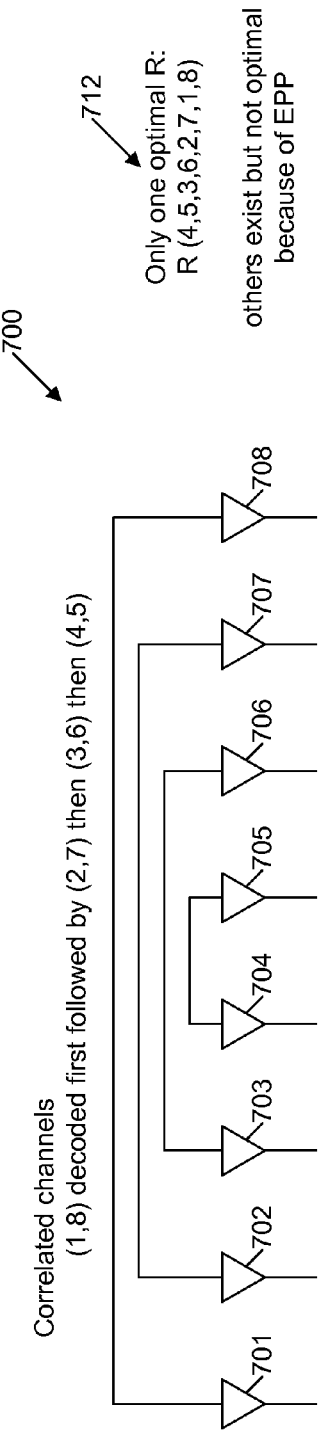
FIG. 7B is a block diagram illustrating another example of pairing of antenna elements of the linear antenna array.

FIG. 7B is a block diagram illustrating another example of pairing of antenna elements of the linear antenna array 700 of FIG. 7A. In the example of FIG. 7B, the antenna array 700 is operating in a correlated channel environment, and so it is desirable to increase the separation between the paired antenna elements. In the example of FIG. 7B the antenna elements 701-708 may be paired, for example, with the first and eight antenna elements 701 and 708 are paired together, the second and seventh antenna elements 702 and 707 paired together, the third and sixth antenna elements 703 and 706 paired together, and the fourth and fifth antenna elements 704 and 705 paired together. In the example of FIG. 7B, there is a maximum separation between the first and eight antenna elements 701 and 708, but the fourth and fifth antenna elements 704 and 705 are adjacent to each other. In this example, there is only one optimal R matrix 712, although other matrices exist, but are not optimal because of EPP.

Figure 7C:
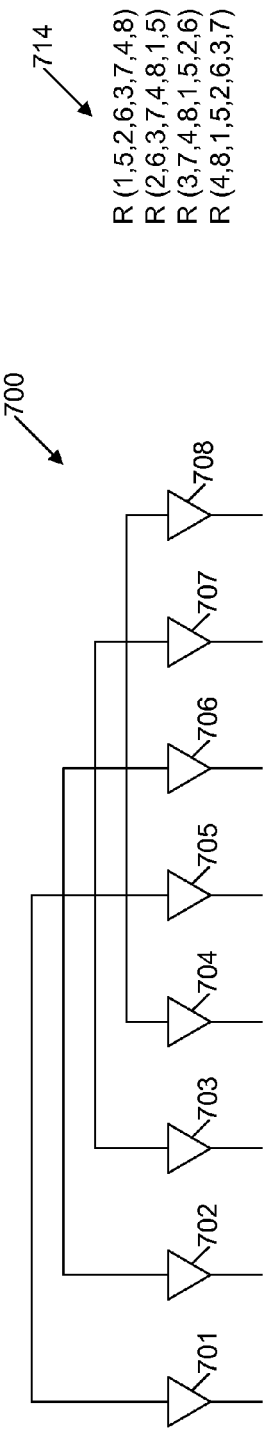
FIG. 7C is a block diagram illustrating another example of pairing of antenna elements of the linear antenna array.

FIG. 7C is a block diagram illustrating another example of pairing of antenna elements of the linear antenna array 700 of FIG. 7A. In the example of FIG. 7C, the antenna array 700 is again operating in a correlated channel environment, so it is desirable to increase the separation between the paired antenna elements. In the example of FIG. 7C the antenna elements 701-708 may be paired, for example, with the first and fifth antenna elements 701 and 705 paired together, the second and sixth antenna elements 702 and 706 paired together, the third and seventh antenna elements 703 and 707 paired together, and the fourth and eight antenna elements 704 and 708 paired together. In the example of FIG. 7C, there is a maximum possible constant separation between all of the antenna element pairs. In this example, there are four examples of sample R matrices 714.

Figure 8A:
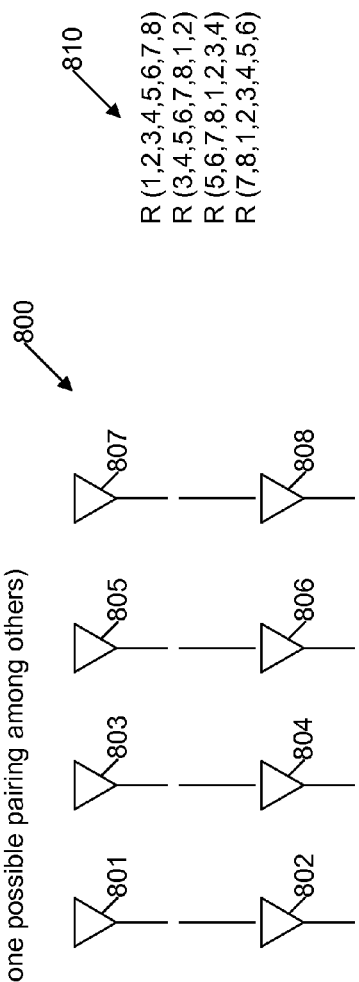
FIG. 8A is a block diagram illustrating an example of pairing antenna elements in a rectangular antenna array.

FIG. 8A is a block diagram illustrating an example of pairing antenna elements in a rectangular antenna array 800. As shown in the example of FIG. 8A, there are eight antenna elements 801-808. In a non-correlated channel environment the antenna elements 801-808 may be paired, for example, as shown in FIG. 8A where adjacent antenna elements are paired together. For example, the first and second antenna elements 801 and 802 are paired together, the third and fourth antenna elements 803 and 804 are paired together, the fifth and sixth antenna elements 805 and 806 are paired together, and the seventh and eight antenna elements 807 and 808 are paired together. In the example of FIG. 8A, because there is no, or low, correlation between the channels the separation between the antenna elements is less of a factor in system performance. The antenna configuration illustrated in FIG. 8A has four sample R matrices 810.

Figure 8C:
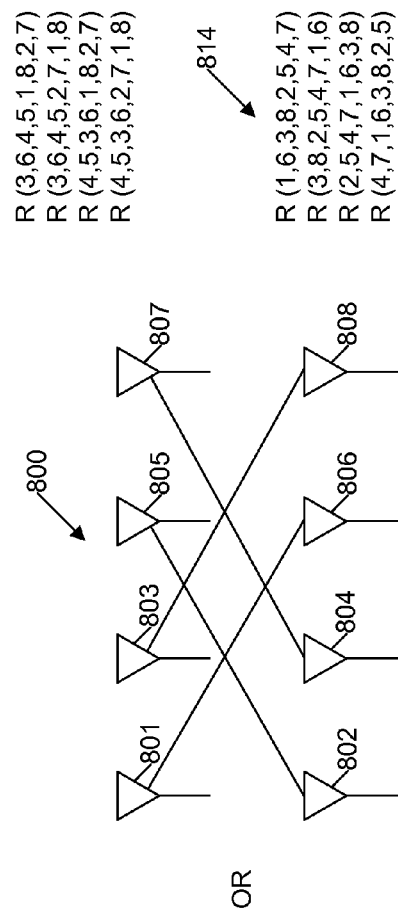
FIG. 8C is a block diagram illustrating another example of pairing of antenna elements of the rectangular antenna array.
Figure 8B:
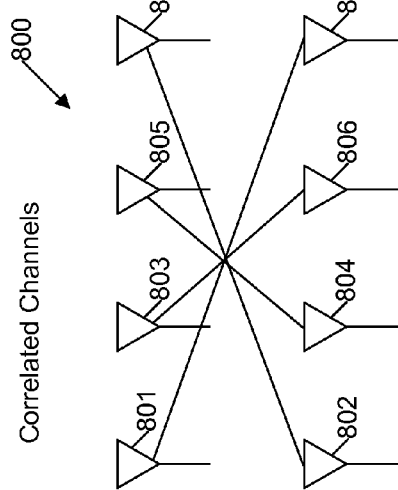
FIG. 8B is a block diagram illustrating another example of pairing of antenna elements of the rectangular antenna array.

FIG. 8B is a block diagram illustrating another example of pairing of antenna elements of the rectangular antenna array 800 of FIG. 8A. In the example of FIG. 8B, the antenna array 800 is operating in a correlated channel environment, and so it is desirable to increase the separation between the paired antenna elements. In the example of FIG. 8B the antenna elements may be paired, for example, with the first and eight antenna elements 801 and 808 are paired together, the second and seventh antenna elements 802 and 807 paired together, the third and sixth antenna elements 803 and 806 paired together, and the fourth and fifth antenna elements 804 and 805 paired together. In the example of FIG. 8B, there is a maximum separation between the first and eight antenna elements 801 and 808 (same for 802 and 807 as well), but the fourth and fifth antenna elements 804 and 805 and the third and sixth antenna elements 703 and 706 have less separation to each other. The antenna configuration illustrated in FIG. 8B has four sample R matrices 812.

FIG. 8C is a block diagram illustrating another example of pairing of antenna array elements of the rectangular antenna array 800 of FIG. 8A. In the example of FIG. 8C, the antenna array 800 is again operating in a correlated channel environment, so it is desirable to increase the separation between the paired antenna elements. In the example of FIG. 8C the antenna elements may be paired, for example, with the first and sixth antenna elements 801 and 806 paired together, the second and fifth antenna elements 802 and 805 paired together, the third and eight antenna elements 803 and 808 paired together, and the fourth and seventh antenna elements 804 and 807 paired together. In the example of FIG. 8C, there is a constant separation between all of the antenna element pairs. In this example, there are four examples of sample R matrices 814.

Figure 9A:
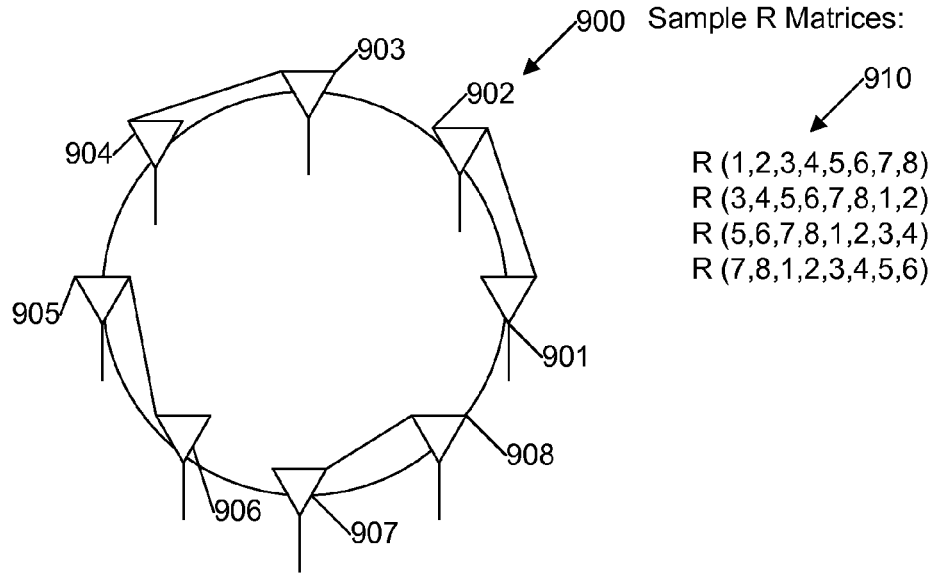
FIG. 9A is a block diagram illustrating an example of pairing antenna elements in a circular antenna array.

FIG. 9A is a block diagram illustrating an example of pairing antenna elements in a circular antenna array 900. As shown in the example of FIG. 9A, there are eight antenna elements 901-908. In a non-correlated channel environment the antenna elements 901-908 may be paired, for example, as shown in FIG. 9A where adjacent antenna elements are paired together. For example, the first and second antenna elements 901 and 902 are paired together, the third and fourth antenna elements 903 and 904 are paired together, the fifth and sixth antenna elements 905 and 906 are paired together, and the seventh and eight antenna elements 907 and 908 are paired together. In the example of FIG. 9A, because there is no, or low, correlation between the channels the separation between the antenna elements is less of a factor in system performance. The antenna configuration illustrated in FIG. 9A has four sample R matrices 910.

Figure 9B:
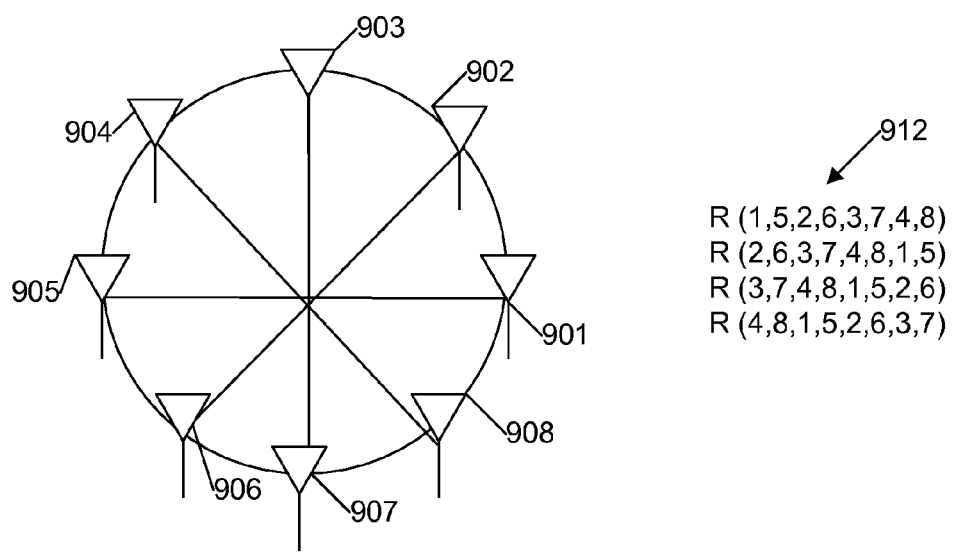
FIG. 9B is a block diagram illustrating another example of pairing of antenna elements of the circular antenna array.

FIG. 9B is a block diagram illustrating another example of pairing of antenna elements of the circular antenna array 900 of FIG. 9A. In the example of FIG. 9B, the antenna array 900 is operating in a correlated channel environment, so it is desirable to increase the separation between the paired antenna elements. In the example of FIG. 9B the antenna elements may be paired, for example, with the first and fifth antenna elements 901 and 905 paired together, the second and sixth antenna elements 902 and 906 paired together, the third and seventh antenna elements 903 and 907 paired together, and the fourth and eight antenna elements 904 and 908 paired together. In the example of FIG. 9B, there is a constant separation between all of the antenna element pairs. In this example, there are four examples of sample R matrices 914.

The circular antenna arrays of FIGS. 9A and 9B illustrate an interesting aspect of pairing of the antenna elements. The array arpeture and the transmit correlation between the paired antenna array elements remain a constant, regardless of the number of antennas in the array.

In an embodiment, a AQRN-SIC is an M×M (M>=3) MIMO detection technique that combines various aspects to achieve excellent performance at low complexity. On the transmit (Tx) end of the communications link (such as a base station, access point, or terminal) the AQRN-SIC technique organizes the Tx signals into groups of two each when the number of Tx antennas M is even. When the number of transmit antennas M is odd one of the signals forms a group on its own while the others are grouped as described above.

As discussed in FIG. 7-9, pairing two signals can be done in a way to maximize the physical distance between their respective antennas. Each pair of signals are space-time encoded, for example, by the Rate-1 Alamouti code. When the number of transmit antennas M is odd the signal that forms a group on its own is left uncoded. The signals are then transmitted through the M×M MIMO channel H=[h1, h2, . . . $h_N$], where hj (j=1, 2, . . . M) are column vectors representing the various flat-fading paths between Tx antenna j and the M Rx antennas.

On the receive (Rx) end of the communications link (such as a base station, access point, or terminal) one or more (up to N/2) QR decompositions are performed on the estimated channel column-wise-permuted matrices $H_p$ (p=1, 2, . . . int(N/2)), and as a result, virtual channel matrices $R_p[r\_(1,i)$ $r\_(2,i) \ldots r_{(N,p)}]$ are formed, where $r_{(1,p)}$ are column vectors representing the various virtual flat-fading paths between Tx antennas j and the M Rx antennas using virtual matrix R_i The permuted H_i channel matrices are obtained in such a way that each pair of symbols (sj,sk) that were coded jointly will find their corresponding columns j and k placed side-by-side in $H_p$. When the number of transmit antennas M is odd that column corresponding to the uncoded signal is placed first in all of $H_p$. Int(N/2) $H_p$ are obtained by doing circular left-shifting while keeping each column pair side-by-side. When the number of transmit antennas M is odd the first column is bypassed and left untouched. New Rx vectors $y_p$ are obtained by multiplying the receive vector w by the hermitian conjugate of $Q_p$. Decoding to obtain immediate estimates of different pairs $(s_{(j,p)}, s_{(k,p)}$ (j,k ∈ {1, 2, ... N}, j not equal to k) is done by employing Alamouti Rx processing on the last two rows of each $R_p$. Matrix factorizations to obtain $Q_p$ and $R_p$ matrices need only be done at the beginning before actual data decoding commences. New transformed data vectors are computed once for every received data vector.

The systems and methods described above can be modified to obtain better decision statistics for transmitted pairs $(s_j, s_k)$ by performing successive interference cancellation (SIC) to remove the contribution of the already decoded symbols. New estimates of the different pairs are then obtained. Interference Cancellation can be performed by subtracting $sh_{(j,p)}*r_{(j,p)} + sh_{-(k,p)}*r_{(k,p)}$ (where $(sh_{(j,p)}, sh_{-k,p})$ are the recently decoded hard-decision estimates of $(s_j, s_k)$) from $y_p$ after each decoding stage while at the same time updating $y_p$, i.e. $y_p = y_p - sh_{(j,p)}*r_{(j,p)} - sh_{(k,p)}*r_{(k,p)}$. This process is repeat until no symbols are left for decoding. When the number of transmit antennas M is odd an estimate of the uncoded symbol $s_U$ may be obtained after the last SIC stage is performed using the equation:

$$s_U = (\text{conj}(r_{(11,p)})*y_{(1,p)})/(\text{conj}(r_{(11,p)})*r_{(11,p)}) \quad \text{(Equation 16)}$$

where: $r_{(11,p)}$ is the first element in column vector $r_{(1,p)}$, conj(.) is the complex conjugate operator; and $y_{(1,p)}$ is the first element in vector $y_p$ Averaging may be performed once all estimates of $(s_j, s_k)$ (and $s_U$ when M is odd) are obtained from all QR operations, Rx Alamouti decoding and SIC. Turbo iterations can be performed which may obtain even further performance improvement. Turbo iterations may be done by feeding the hard-decision averaged estimates of pairs $(s_j, s_k)$ back to be used for the first interference cancellation stage (that is after the first decoding stage).

In the examples described, a QR factorization, or decomposition, was performed to obtain Q and R matrices. Similar operations can be performed using a QL decomposition to obtain Q and L matrices. In QL decomposition the elements of the L matrix that are above the diagonal will be zero and the technique will start decoding the first two rows instead of the last two rows and so on. In other words, the operation works top down as opposed to QR which works bottom up. In some ways this is similar to when the H matrix is permuted to obtain new Q and R matrices which basically has the same effect of calculating a QL decomposition on the same non-permuted matrix H.

Although the description has focused on examples that reach a tradeoff between diversity and multiplexing gains, the technique(s) described herein can be used (with very minor modifications) to obtain more multiplexing gain at the expense of less diversity gain or vice versa. For example, some of the Tx signals need not be space-time encoded and as a result multiplexing gain increases while the overall diversity decreases. On the other hand, the same pairs of Tx signals can be transmitted from various antennas (more than 2) simultaneously and as a result the diversity gain increases while the multiplexing gain decreases.

Also, while the examples have focused on architectures that assume that the channel only undergoes frequency-flat fading the technique is also applicable to frequency-selective channels, such as where OFDM techniques are generally used. In this case the symbols $s_j$ will each represent a sub-carrier rather than a standard symbol as understood in a single carrier systems.

The above description of the disclosed embodiments is provided to enable any person skilled in the art to make or use the invention. Numerous modifications to these embodiments would be readily apparent to those skilled in the art, and the principals defined herein can be applied to other embodiments without departing from the spirit or scope of the invention. Thus, the invention is not intended to be limited to the embodiments shown herein but is to be accorded the widest scope consistent with the principal and novel features disclosed herein.

Various implementations of the invention are realized in electronic hardware, computer software, or combinations of these technologies. Some implementations include one or more computer programs executed by one or more computing devices. For example, in one implementation, the method for monitoring and/or converting the status, running diagnostics, and otherwise providing functions related to status and management of the wireless communication device includes one or more computers executing software implementing the monitoring and management functions. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention.

Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent example implementations of the invention and are therefore representative of the subject matter which is broadly contemplated by the present invention. It is further understood that the scope of the present invention fully encompasses other implementations and that the scope of the present invention is accordingly limited by nothing other than the appended claims.

The invention claimed is:

1. A method of detecting signals in a multiple-input multiple-output (MIMO) communication system, the method comprising:
   receiving symbols coded into pairs using a space-time code;
   estimating a channel matrix that identifies the response between multiple transmit and receive antennas in the MIMO communication system;
   performing a QR factorization on the channel matrix to obtain Q and R matrices;
   determining a receive vector corresponding to a plurality of transmitted symbols received by the multiple receive antennas;
   transforming the receive vector based upon the Q matrix;
   estimating a value of at least two received symbols using the transformed receive vector to determine at least two estimated symbols;
   removing a contribution of the estimated symbols from the transformed receive vector to determine a revised received vector; and
   estimating a value of at least two additional received symbols using the revised received vector to determine at least two additional estimated symbols.

2. The method of claim 1, wherein the space-time code is a 2×2 space-time code.

3. The method of claim 1, wherein the space-time code is an Alamouti code.

4. The method of claim 1, wherein estimating a value of at least two received symbols comprises using a hard decision estimate of at least two received symbols.

5. The method of claim 1, wherein transforming the receive vector comprises multiplying the receive vector by a hermitian conjugate of the Q matrix.

6. A method of detecting signals in a multiple-input multiple-output (MIMO) communication system, the method comprising:
   receiving symbols coded into pairs using a space-time code;
   estimating a channel matrix that identifies the response between multiple transmit and receive antennas in the MIMO communication system;
   performing a plurality of QR factorizations on the channel matrix to obtain a plurality of Q and R matrices;
   determining a receive vector corresponding to a plurality of transmitted symbols received by the multiple receive antennas;
   performing a plurality of transformations of the receive vector based upon the plurality of Q matrices to obtain a plurality of transformed receive vectors;
   estimating a value of at least two received symbols for each of the plurality of transformed receive vectors to determine at least two estimated symbols;
   removing a contribution of the estimated symbols from the transformed receive vectors to determine a revised received vector for each of the transformed receive vectors; and
   estimating a value of at least two additional received symbols for each of the plurality of transformations using the corresponding revised received vector to determine at least two additional estimated symbols.

7. The method of claim 6, wherein performing the plurality of QR factorizations comprises permuting columns in the channel matrix.

8. A method of detecting, in a receiver having multiple receive antennas, signals transmitted from multiple transmit antennas generated from symbol pairs that are space-time coded, the method comprising:
   determining a channel matrix that identifies the response between the multiple transmit and receive antennas;
   transforming the channel matrix to a virtual channel;
   performing partial spatial filtering based upon the virtual channel on received signals;
   performing space-time decoding on the partial spatial filtered received signals;
   making decision estimates of symbols represented by at least one of the received signals; and
   performing interference cancellation using the estimates of symbols.

9. The method of claim 8 wherein partial spatial filtering and interference cancellation are repeated.

10. A method of detecting, in a receiver having multiple receive antennas, signals transmitted from multiple transmit antennas generated from symbol pairs that are space-time coded, the method comprising:
   determining a channel matrix that identifies the response between the multiple transmit and receive antennas;
   transforming the channel matrix to a virtual channel;
   performing partial spatial filtering based upon the virtual channel on received signals;
   performing space-time decoding on the partial spatial filtered received signals;
   making a decision estimate of a pair of symbols received through a pair of the receive antennas separated by a maximum distance; and
   performing interference cancellation based on at least the estimated pair of symbols.

* * * * *